April 14, 1964 J. E. LOVELL 3,129,412

MAGNETOSTRICTIVE THIN FILM DELAY LINE

Filed Aug. 27, 1962 2 Sheets-Sheet 1

INVENTOR.
JOHN E. LOVELL

BY

ATTORNEY

MAGNETOSTRICTIVE THIN FILM DELAY LINE

Filed Aug. 27, 1962 2 Sheets-Sheet 2

3,129,412
MAGNETOSTRICTIVE THIN FILM DELAY LINE

John E. Lovell, Greenwich, Conn., assignor to International Business Machines Corporation, New York, N.Y., a corporation of New York Filed Aug. 27, 1962, Ser. No. 219,585
11 Claims. (Cl. 340—174)

This invention relates to a magnetostrictive delay line and, more specifically, to a delay line employing an anisotropic thin magnetic film to which succeeding waves of tension and compression are applied to propagate information along the film with means coupled to the film for reversing, cancelling, or aiding the propagation of the information in the film.

Since the onset of magnetic thin film technology, the anticipated reduction of fabrication costs with the added benefits of high speed switching and compact packaging has caused an abundance of research directed primarily to the use of magnetic thin films to replace ferrite cores in a magnetic core memory having the attributes of coincident current selection. As with the case of ferrite core memories, magnetostrictive delay lines have long been recognized as having many desirable attributes for use in data processing equipment and, in some instances, due to cost considerations, have been more profitably employed in small low cost data handling machines.

With the above considerations in view, a magnetostrictive delay line is constructed according to this invention which comprises an elongated planar thin magnetic film whose easy axis is transverse with respect to the longitudinal axis of the film. The film may exhibit positive or negative magnetostriction so as to exhibit at least a mechanically induced longitudinal axis of the film in response to an applied mechanical tension or compression in a similar direction. The induced longitudinal anisotropy is controlled to cause rotation of the magnetization along the direction of induced anisotropy. Means are provided coupled to the film for applying succeeding waves of tension and compression along the longitudinal axis of the film having a repetition frequency ($fo$). The means here contemplated is a nonmagnetic substrate on which the film is deposited and which expands and contracts in response to acoustical waves applied by means of an acoustical transducer connected to one extremity of the substrate. An input circuit is provided inductively coupling a first portion of the film for applying a longitudinal field thereto in either one or an opposite direction when the first portion exhibits an induced longitudinal anisotropy in response to an applied stress wave to insure rotation of the magnetization in either one or an opposite direction to define different binary values. Rotation of the magnetization along the longitudinal axis of the film establishing a Néel wall, which is normally propagated along the length of the film by the tension wave or a compression wave, depending upon whether the magnetostriction of the film is positive or negative, and induces a signal of one or an opposite polarity in an output circuit inductively coupled to a second portion of the film. Further means are provided coupled to an opposite extremity of the film for applying succeeding waves of tension and compression thereto having a similar repetition frequency ($fo$). The further means here takes the form of a further acoustical transducer connected to the opposite extremity of the substrate member. Also provided is a means for controlling the phase of the tension and compression waves applied to one extremity of the film with respect to the phase of the tension and compression waves applied to the other extremity of the film. The latter means operates to provide a variety of desirable controls on the direction and speed of the domain wall propagation within the film.

If the phase of the tension and compression waves with respect to one another is positive, the rate of propagation of the tension and compression waves in one direction is increased. If the phase of the tension and compression waves with respect to one another is negative, or greater than 180°, the tension waves are propagated in a reverse direction with their rate being dependent upon the disparity of negative phase relationship. If the phase of the tension and compression waves provided by both means with respect to one another is exactly 180°, then the waves cancel one another and the information propagation is stopped. In effect, by providing 180° phase difference between the mechanical waves, decoupling is provided and the information, in the form of a domain wall, is remanently stored within the film.

Accordingly, it is a prime object of this invention to provide an improved magnetostrictive delay line in which information may be controlled to propagate in one direction, an opposite direction and stopped.

Another object of this invention is to provide an improved magnetostrictive delay line in which both the direction and rate of information propagation is controlled.

Still another object of this invention is to provide a magnetostrictive device in which induced mechanized stress to a magnetizable medium and an inductively induced field is employed to register information in the medium and means are provided for decoupling the mechanical stress waves from the magnetizable medium to cause remanent storage of the information in the medium.

Yet another object of this invention is to provide a magnetostrictive anisotropic thin magnetic film to which mechanical stress is applied for propagating information therein in which the information propagation is controllable for reverse, forward and stop operation.

The foregoing and other objects, features and advantages of the invention will be apparent from the following more particular description of a preferred embodiment of the invention, as illustrated in the accompanying drawings.

Figure 2:
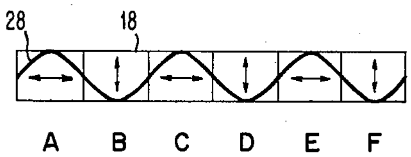
FIG. 2 is a hypothetical illustration of the effect of a mechanical stress wave applied to the delay line of FIG. 1.

FIGS. 3*a*–3*f* illustrate a conception of information propagation in the delay lines of FIG. 2.

Figure 4:
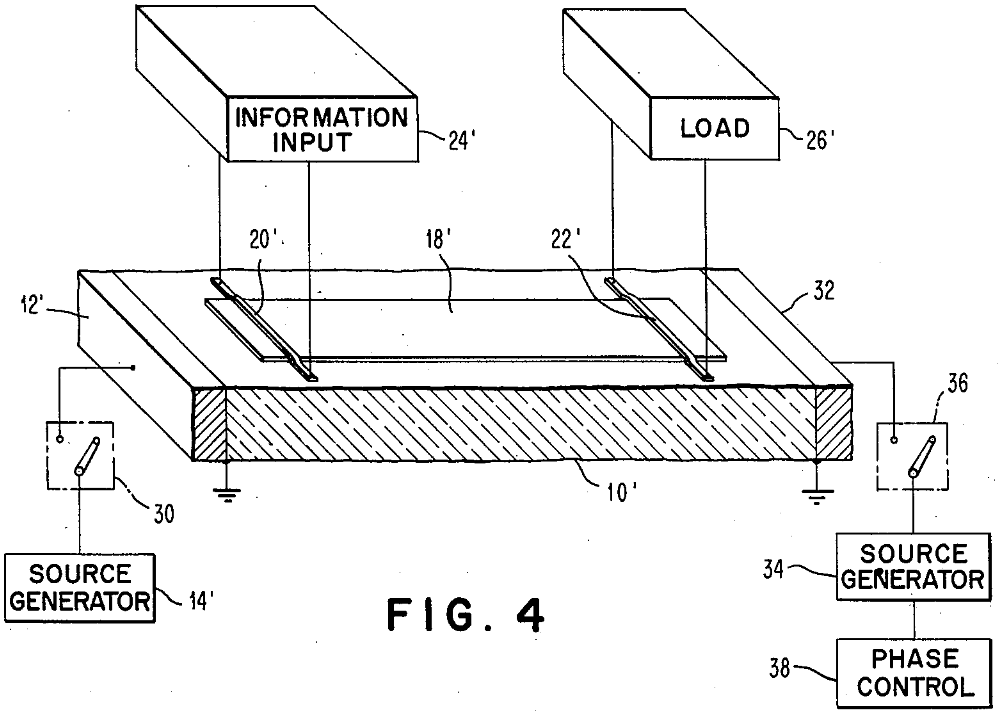

FIG. 4 illustrates an improved delay line according to an embodiment of this invention.

Figure 5A:
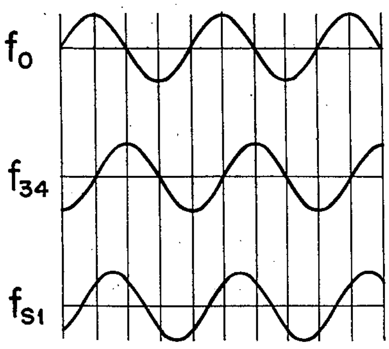
Figure 5B:
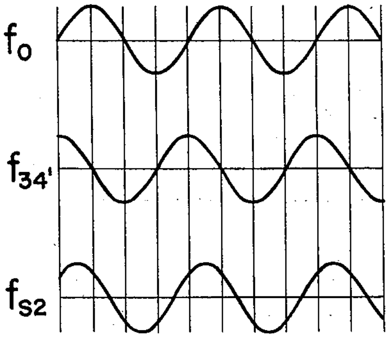

FIGS. 5*a* and 5*b* illustrate the mechanical stress waves applied in the delay line of FIG. 4.

Figure 1:
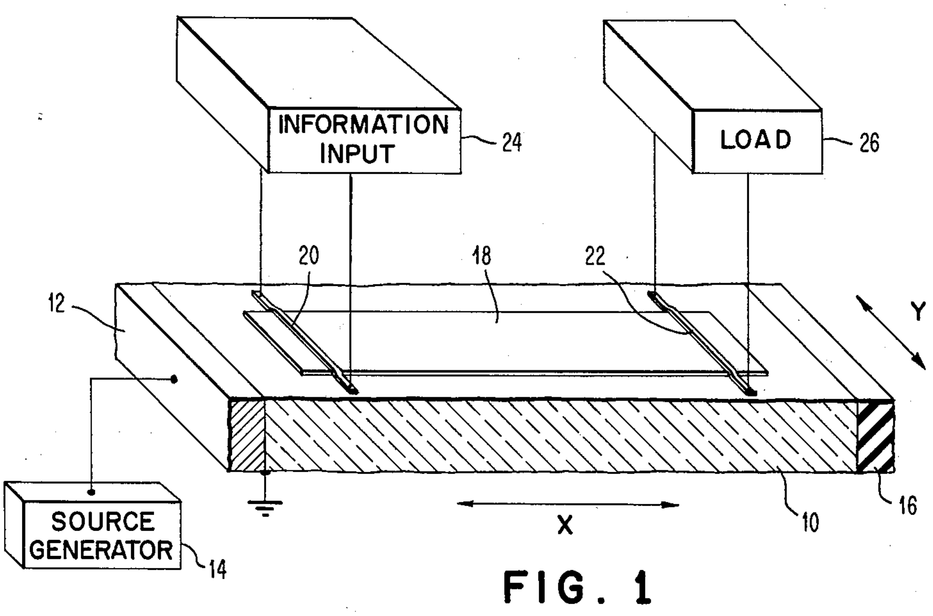
FIG. 1 is a schematic illustration of a magetostrictive delay line.

Referring to FIG. 1 there is provided a suitable nonmagnetic substrate member 10, made of single crystal or fused quartz material which has a characteristic of compressing and expanding in response to acoustical signals applied thereto with a minimum amount of attenuation. That is, with respect to the longitudinal axis of the substrate member 10, here defined by an arrowed X axis, the material of member 10 expands and contracts with respect to the longitudinal X axis in response to acoustical waves applied thereto by means of an acoustical transducer 12. The acoustical transducer 12 is connected at one end of the member 10 and connected to a source generator 14. At the opposite end of substrate member 10 an absorbing medium 16 is provided for absorbing any strain or stress of the substrate member 10. It should be understood that instead of the absorbing medium 16, the substrate 10 could be tapered at this end and the effect would be the same. Deposited on one surface of the member 10 is a uniaxial anisotropic magnetic thin film 18 exhibiting an easy axis of magnetization directed along a transverse axis of the member 10 indicated by an arrowed line Y. The magnetic film 18 may be deposited on the member 10 by any well-known method such as vacuum evaporation, cathode disintegration, electroplating, etc., in the presence of a magnetic field to provide the easy axis of remanent flux orientation which is directed along the axis Y and is in alignment with the direction of the magnetic field applied during the deposition process. The magnetic material deposited is an alloy of nickel-iron comprising approximately 85% Ni and 15% Fe, or 75% Ni and 25% Fe by weight. The particular composition of ferromagnetic material is chosen so that the film 18 may exhibit negative magnetostriction, (85% Ni–15% Fe) or positive magnetostriction (75% Ni–25% Fe).

Positive magnetostriction may be defined as that property of a magnetic material, such as film 18, when subjected to a mechanical tension and compression along its longitudinal axis, to exhibit an induced tension anisotropy directed along the direction of longitudinal stress and to exhibit an induced compression anisotropy directed transverse to the longitudinal direction of compression. Negative magnetostriction may be defined as that property of a magnetic material, when subjected to a mechanical tension and compression along its longitudinal axis, here the X axis, to exhibit an induced compression anisotropy directed along the longitudinal axis of compression, the X axis, and to exhibit an induced expansion anisotropy transverse to the direction of longitudinal tension, here the Y axis. For more details with respect to the differences in magnetostriction, reference may be made to a book entitled, "Ferromagnetism" by Richard Bozorth, published by the D. Van Nostrand Company, Inc. copyrighted and first published in 1951, and reprinted in 1953 and 1955. Thus, assuming the film 18 exhibits positive magnetostriction, when the member 10 is compressed, the direction of compression anisotropy of film 18 will be along the Y axis and when the substrate member 10 is under tension, i.e., expansion, the direction of expansion anisotropy of the film 18 will be along the X axis. The medium 10 and, hence, the film 18 which is coupled thereto will undergo tension, and compression in response to acoustical waves provided by source generator 14 through transducer 12.

An input conductor 20 and an output conductor 22 is provided coupling the film 18 at opposite ends in alignment with the easy axis Y. The input conductor 20 is connected to an information signal input means 24 while the output conductor 22 is connected to a load 26.

Referring to FIG. 2, the magnetic film 18 is hypothetically shown as defining six zones labelled A–F. Super-imposed upon the film 18 is a curve 28 representing, at a given instant, an acoustical wave in the member 10 which is of sinusoidal form similar to the signals provided by source generator 14 and having a given frequency (*fo*). The acoustical wave may be considered as providing a series of tension and compression waves which cause the film 18 to exhibit an induced longitudinal anisotropy in the portions A, C and E along the X axis as indicated, and an induced transverse anisotropy in the portions B, D and F along the Y axis as indicated. The direction of the induced contraction anisotropy indicated in portions B, D and F takes place when the film 18 exhibits positive magnetostriction. If the film 18 exhibits negative magnetostriction, then the induced compression anisotropy would be aligned along the longitudinal axis of the film similar to that illustrated to portions A, C and E, while the direction of induced tension anisotropy would be aligned transverse to the longitudinal axis of the film 18, similar to that illustrated for the zones B, D and F.

The acoustical wave provided in medium 10 by energization of transducer 12 by source 14 is controlled so that the induced tension anisotropy, assuming the film 18 exhibits positive magnetostriction, is sufficient, of and by itself, to cause rotation of the magnetization of any one hypothetical zone along the X axis. In practice, the magnetization of the film 18, along its length, is reoriented in a given direction along the easy axis of the film 18 by use of the earth's magnetic field or by preferably employing a Helmholtz coil (not shown).

Figure 3A:
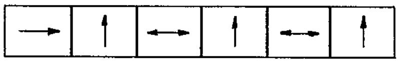

As will become apparent subsequently, the information input means 24 is operative to provide either a positive or negative impulse to the input conductor 20 each time the portion of the film 18 coupled exhibits a mechanically induced longitudinal anisotropy due to either compression or tension. Assume that during a time when the first portion of film 18, zone A, is subjected to tension, the signal input means 24 energizes the conductor 20 so as to apply a magnetic field directed along the longitudinal axis of the film 18 toward the right. Since the induced longitudinal anisotropy due to tension is great enough to cause orientation of the magnetization along the X axis, the applied field causes the magnetization of zone A to rotate to the right in the plane of the film 18. Referring to FIG. 3*a*, zone A of film 18 is shown having its magnetization oriented toward the right along the X axis of the film, the zones C and E are shown having their magnetization vectors also directed along the X axis of the film 18, but a double-headed arrow is employed to connote that the magnetization of these portions could be directed either to the left or right. The zones B, D and F are shown having their magnetization oriented along the transverse Y axis of the film 18 in an upward direction in accordance with the transverse bias field provided.

Figure 3B:
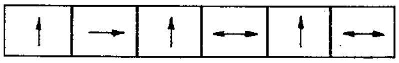

FIG. 3*b* illustrates the magnetization of the film 18 when the mechanical tension and compression wave has moved one zone to the right. As shown, the magnetization of zones A, C and E is oriented upward along the easy axis of film 18 due to the mechanically induced compression anisotropy and the transverse bias field applied to the film. The magnetization of zone B is oriented to the right along the longitudinal axis of the film 18 due to the induced longitudinal anisotropy from the mechanical tension of this portion and the bias provided to this portion by the magnetization of the previous zone A. The magnetization of zones D and F are illustrated as oriented along the longitudinal, X axis, of the film 18 and use of the double-headed arrows indicate that the orientation in these zones could be either to the left or right.

Figure 3C:
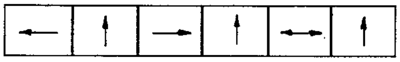

Assume that when the zone A is again subjected to mechanical tension, causing the magnetization to rotate along the X axis due to induced longitudinal anisotropy, the input means 24 energizes the input conductor 20 to apply a field to the zone A directed to the left. The magnetization of zone A is then oriented along the X axis to the left, as shown in FIG. 3*c* and the magnetization of zones B, D and F is oriented upward along the easy axis of film 18. The magnetization of zone C is oriented to the right along the longitudinal X axis of film 18 due to the induced longitudinal tension anisotropy and the magnetic bias provided by the previous magnetic orientation of zone B. Again the magnetic orientation of zone E is illustrated as being along the longitudinal X axis of the film 18 due to the induced longitudinal tension anisotropy; however, a doubled-headed arrow indicates that orientation of this zone could be to the right or left.

Figure 3D:
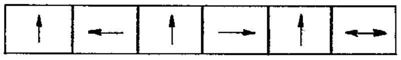
Figure 3E:
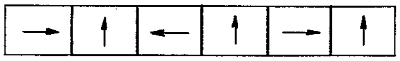

As the mechanical wave to the film 18 propagates to the right, as shown in FIG. 3*d*, the zones A, C and E are subjected to an induced transverse anisotropy, due to compression, while the zones B, D and F are subjected to an induced longitudinal anisotropy, due to tension. The zones A, C and E have their magnetization oriented upward due to the earth's magnetic bias field or a pair of Helmholtz coils, while the magnetization of zone B is oriented to the left due to the previous magnetization of zone A and the magnetization of zone D is oriented to the right due of the previous magnetization of zone C. The zones A, C and E are thereafter subjected to a mechanically induced longitudinal anisotropy due to tension while the zones B, D and F are subjected to a mechanically induced transverse anisotropy, due to compression, as shown in FIG. 3*e*. In the FIG. 3*c*, it is assumed that the input conductor 20 is energized by means 24 to apply a longitudinal magnetic field to the zone A of film 18 directed to the right, causing orientation of the magnetization of zone A to the right along the X axis. The magnetization of zones B, D and F is upward along the easy axis of film 18; the magnetization of zone C is directed to the left along the longitudinal axis X of film 18, while the magnetization of zone E is directed to the right and along the longitudinal axis X of the film.

Figure 3F:
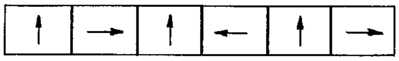

FIG. 3*f* illustrates the relative magnetization of the hypothetical zones A–F for the zones A, C and E subjected to mechanically induced longitudinal anisotropy while the zones B, D and E are subjected to induced transverse anisotropy. Assuming that the output conductor 22 traverses the zone F, it may be seen that a change in magnetization is detected between the direction of magnetization of the zone F as illustrated in FIG. 3*e* and that of FIG. 3*f*. Note that as between the change of orientation of magnetization sensed by the conductor 22 as illustrated by zone F in FIG. 3*e* and FIG. 3*f*, there is a clockwise rotational change. It may be seen that as the mechanical wave progresses along the film 18 in FIG. 3*f*, the magnetization of zone E will be propagated to zone F and thereafter shown for zone D. As between the magnetization of zone E with respect to zone D, the output conductor 22 will see a counerclockwise rotation of magnetization. Thus, different binary information is detected by a difference in polarity.

In each of the FIGS. 3*a*–3*f*, a darkened area is shown intermediate the different zones wherein the magnetization of one zone differs from the magnetization of an adjacent zone. The darkened area is employed to connote the existence of a domain wall or magnetic discontinuity. Although the total magnetization of each zone A-F is shown oriented in a given direction, what really takes place is that the magnetization rotates within the plane of the film 18 from one direction of orientation to another. Since the magnetic discontinuity from zone to zone is established by rotation from one given direction to a direction perpendicular with this in the plane of the film, the discontinuity takes the form of a Néel wall as opposed to a Bloch wall. The difference between Néel walls and Bloch walls is well understood by those versed in the art and is also described by Bozorth op. cit. With respect to the probability of Néel walls or Bloch walls being created in a magnetic material of specified thickness, reference is made to an article entitled, "Remarks on the Theory of Magnetic Properties of Thin Films and Fine Grains" by Louis Néel, appearing in the Journal of Physics Radium, Vol. 17, No. 3, (1956). Simply, a Néel wall may be considered as one in which the magnetization vectors between adjacent areas of magnetization are rotated in the same plane, such as the plane of the film 18, while for Bloch walls, these vectors rotate out of this plane. That is, with respect to the plane of film 18, the magnetization vectors for a Bloch wall would be rotated out of the plane of the film to a direction perpendicular with its plane. A further explanation of the movement of a Néel wall and its form with respect to a Bloch wall is provided by reference to an article entitled "Proposal for Magnetic Domain Wall Storage and Logic" by D. O. Smith, IRE Transactions on Electronic Computers, Vol. EC–10, No. 4, pages 708–711 December 1961.

It may be seen, therefore, that binary information may be entered into the circuit of FIG. 1 when the portion of film 18 coupled by input conductor 20 is subjected to a mechanically induced longitudinal anisotropy due to tension, for positive magnetostriction, or compression, for negative magnetostriction. As this portion of the film 18 coupled yb input conductor 20 is subjected to induced longitudinal anisotropy, the input conductor 20 may be energized to initiate a Néel wall, which is then propagated along the member 10. With respect to any one portion of the film 18, after a Néel wall has passed therethrough, assuming the film 18 exhibits positive magnetostriction, then when a portion of the film 18 is subjected to compression, the induced compression anisotropy alone reorients the magnetization of that portion of the film 18 along its easy axis, the transverse Y axis. In order to insure that the magnetization of each portion of the film 18 orients itself in the same direction along the easy axis of the film, the structure or film itself may be positioned within the earth's magnetic field to provide a magnetic bias directed along the easy axis of film 18 in the upward direction along the Y axis, or as stated above the structure may preferably be encased in a Helmholtz coil to provide the biasing field in the Y direction.

The circuit of FIG. 1 functions as a delay line in that information is put into the circuit and at some defined interval of time is available at its output. In order to store the information, the information could be circulated by providing a closed loop arrangement, such as coupling the output conductor 22 back to the input conductor 20. Although a circulating loop may be provided as set forth, the inherent storage capabilities of the magnetic film 18 is not utilized, requiring the source generator 14 to be operated constantly without breakdown.

In FIG. 4, an improved structure for the circuit of FIG. 1 is shown. Additional means are provided capable of controlling the direction transfer in the film 18 and of decoupling the film from the acoustical waves provided by source 14 to thereby allow the information to be remanently stored in the film 18. For the purposes of clarity, all parts of the FIG. 4 similar to the FIG. 1 are similarly labelled and distinguished by use of a prime notation. In the FIG. 4, the acoustical transducer 12′ is connected to the source generator 14′ through a switching means 30 and on the opposite end of member 10′, in place of the absorbing medium 16 of FIG. 1, a further acoustical transducer 32 is provided connected to a signal source generator 34 through a switching means 36. The generator 34 is adapted to provide signals having a magnitude substantially equal to the magnitude of the signals provided by source 14′, however, connected to the generator 34 is a control means 38 for varying the phase of the signals from source 34 with respect to the signal provided by source 14′.

Referring to FIG. 4, assume the switch 30 is operative to connect source 14′ to transducer 12′ while simultaneously switch 36 operates to connect source 34 to transducer 32. Further, assume that the source 14′ provides an acoustical signal of given frequency (*fo*) to member 10′ while source 34 provides an acoustical signal of the same frequency and is controlled by means 38 to be displaced by a phase angle of 90°. The wave propagation in member 10′ of FIG. 4 is then shown in FIG. 5*a* wherein a waveform labelled (*fo*), similar to the curve 28 of FIG. 2, is illustrated depicting the acoustical wave provided by generator 14′, while a further wave labelled *f34* is illustrated depicting the acoustical wave provided to member 10′ by generator 34. The sum of the acoustical waves is illustrated by a waveform (*fs1*). The FIG. 5*b* illustrates a final acoustical waveform (*fs2*) provided to the member 10′ when the source 34 provides a signal (*f34′*) which is 270° or −90° out of phase with the signal (*fo*). Although an illustration of a waveform provided by source 34 to member 10′ which is 180° out of phase with the waveform (*fo*) is not shown, it is obvious that with such a waveform provided, the acoustical signals would cancel one another.

In operation, the source 34 is controlled by means 38 to generate signals out of phase with the signals produced by the source 14′ and thus, in effect, either add to or detract from the tension or the tension and compression of a given portion of the film 18′. In one case, where the source 34 applies a signal of a frequency equal to (*fo*) which is 180° out of phase therewith, the acoustical waves traveling from both ends of the member 10' are cancelled and the member 10' is neither compressed nor expanded. Under these conditions, it may be seen that with the film 18' having a domain wall being transferred toward the output conductor 22', upon application of the signal from source 34 which cancels the signal from source 14', the domain wall will be permanently established within a given portion of the film 18'. Further by reference to FIGS. *5a* and *5b*, it may be established that in one instance the tension portion of waveform (*fo*) is advanced, (*fs1*), while in another instance the tension portion of waveform (*fo*) is moved in an opposite direction, (*fs2*). Thus, by controlling the phase of the acoustical wave to member 10' supplied by generator 34, with respect to the acoustical waveform provided by generator 14', a domain wall which is established within the film 18' may be propagated toward the output conductor 22' at a desired rate; may be decoupled and remain fixed; or the direction of propagation may be reversed and the rate of propagation in the reversed direction also controlled.

Although a domain wall within the film 18' may be decoupled by controlling the phase of the acoustical waveform to member 10' provided by source 34 to be 180° out of phase with the acoustical waveform provided by source 14' and thereby avoid the necessity of a closed loop arrangement for storing the information in the circuit, again, both generators 14' and 34 must continually provide energy to the circuit. If desired, the information in the form of domain walls may be remanently stored within the film 18' by simultaneously operating both switches 30 and 36 to disconnect source 14' and 34, respectively, from the circuit. The switches 30 and 36 are operated only after the domain wall or walls within the film 18' have been decoupled by providing acoustical waveforms to the member 10' which are 180° out of phase with one another. By disconnecting the sources 14' and 34, since the domain walls have already been decoupled from the acoustical waves, the information is permanently stored within the film 18'.

In order to aid in understanding and practicing the invention and to provide a starting place for one skilled in the art in fabrication of the circuit of the invention, the following set of specifications for one embodiment of FIG. 4 is provided below. It should be understood, however, that no limitation should be construed since other component values and operating fields may be employed with satisfactory operation.

In FIG. 4, the substrate member 10' of fused quartz or single crystal quartz is cut in the longitudinal direction and the transducers 12' and 32 may be made of lead-zirconate-titanite, polarized in the thickness mode. The thickness of the transducers 12' and 32 is determined by the frequency of acoustical signals (*fo*) desired. For a one megacycle frequency of (*fo*), the thickness may be 0.082 inch. The voltage provided by generators 14' and 34 across transducers 12' and 32, respectively, may be a swing of approximately ±50 volts. The input field provided to film 18' by energization of conductor 20' by input source 24' may be 1.0 oersted and the resistance of conductor 20' should be 5 ohms at the frequency employed. That is, the pulse width of the current for energizing conductor 20' is approximately 10–30 nanoseconds for (*fo*) at one megacycle and 3–10 nanoseconds for (*fo*) at 10 megacycles. If desired, either the earth's magnetic field or a bias field of approximately 0.1–0.3 oersted directed in the Y direction, may be provided by use of a Helmholtz coil. Employing an input field of less than 1.0 oersted removes the necessity of the bias field.

While the invention has been particularly shown and described with reference to a preferred mbodiment thereof, it will be understood by those skilled in the art that various changes in form and details may be made therein without departing from the spirit and scope of the invention.

What is claimed is:

1. An information control circuit comprising:
an elongated planar anisotropic thin magnetic film having an easy axis of remanent flux orientation which is transverse with respect to the longitudinal axis thereof and exhibiting, a first mechanically induced anisotropy directed along its longitudinal axis, and a second induced anisotropy directed along the easy axis of said film, in response to a mechanical wave of tension and compression applied along its longitudinal axis;
said magnetic film being affixed to a planar nonmagnetizable substrate member which is responsive to acoustical signals applied along its longitudinal axis to expand and contract along the same axis;
first means coupled to said substrate member at one extremity for applying acoustical signals along its longitudinal axis having a repetition frequency (*fo*) and a magnitude sufficient to cause orientation of the magnetization of said film along the axis of mechanically induced anisotropy;
circuit means inductively coupled to said film for entering and providing an output for a binary value comprising:
an input circuit for applying a field, to a first portion of said film coupled, directed along the longitudinal axis thereof, when the first portion of said film exhibits said first mechanically induced anisotropy to conjointly establish the magnetization of said first portion in one or the other direction along the first axis of induced anisotropy and thereby designate different binary values;
second means coupled to said substrate member at an opposite extremity for applying similar acoustical signals along the longitudinal axis of said substrate member having a repetition frequency (*fo*); and
means for controlling the phase of the signals applied by said second means relative to the signals applied by said first means to control a stop, forward, and reverse propagation of said binary values.

2. The circuit of claim 1, wherein each said first and second means for applying said acoustical signals comprises an electrical generator means connected to said substrate member through a selectively operable switching means.

3. The circuit of claim 2, wherein the switching means of each of said first and second means are operable to simultaneously disconnect the associated electrical generator means when said second means is controlled to provide signals phase displaced from the signals provided by said first means by 180°.

4. The circuit of claim 1, wherein said film exhibits positive magnetostriction.

5. The circuit of claim 1, wherein said film exhibits negative magnetostriction.

6. An information control circuit comprising:
an elongated planar anisotropic thin magnetic film having an easy axis of remanent flux orientation which is transverse with respect to the longitudinal axis thereof and exhibiting at least a mechanically induced longitudinal anisotropy directed along its longitudinal axis in response to a mechanical wave of tension or compression applied along its longitudinal axis;
first means coupled to said film for applying waves of tension and compression along its longitudinal axis having a repetition frequency (*fo*) and a magnitude sufficient to cause orientation of the magnetization of said film along the induced longitudinal axis of anisotropy;
circuit means coupled to different portions of said film for entering and providing an output manifestation for a binary value comprising:
an input circuit for applying a longitudinal field to a first portion of said film when the first portion of said film exhibits said induced longitudinal anisotropy to conjointly establish the magnetization of said first portion of said film in one or an opposite direction along its longitudinal axis and thereby designate different binary values;

second means coupled to an opposite extremity of said film for applying similar waves of compression and tension along its longitudinal axis having a repetition frequency (*fo*); and means for controlling the phase of the signals applied by said second means relative to the signal applied by said first means to control a stop, forward, and reverse propagation of the binary values.

7. A binary information handling circuit comprising:

an elongated anisotropic thin magnetic film having an easy axis of remanent flux orientation which is transverse with respect to the longitudinal axis thereof and exhibiting at least a mechanically induced anisotropy directed along the longitudinal axis of said film in response to mechanical tension or compression applied along its longitudinal axis;

first means coupled to said film for applying succeeding waves of tension and compression along its longitudinal axis;

circuit means inductively coupled to different portions of said film for entering and providing an output manifestation for a binary value comprising:

an input circuit for applying a longitudinal field to a first portion of the film coupled, when said first portion exhibits said induced anisotropy in response to said first means, to conjointly cause orientation of the magnetization of said first portion in one or an opposite direction along the longitudinal axis of said film and thereby designate a binary value;

and further means coupled to said film for decoupling said first means from said film to remanently store said binary value therein.

8. A binary information handling circuit comprising:

an elongated planar anisotropic thin magnetic film having an easy axis of remanent flux orientation directed transverse with respect to the longitudinal axis thereof and exhibiting a first mechanically induced anisotropy along the longitudinal axis thereof and a second mechanically induced anisotropy along the easy axis thereof in response to a mechanical wave of tension and compression applied along its longitudinal axis;

first means coupled to said film for applying mechanical waves of compression and tension along the longitudinal axis thereof;

circuit means inductively coupled to said film for entering said binary information and manifesting an output comprising:

an input circuit for applying a longitudinal field to a first portion of said film when said first portion exhibits said first mechanically induced anisotropy to conjointly establish orientation of the magnetization of said first portion in one or an opposite direction along the longitudinal axis of said film thereby designating a binary value;

and further means coupled to said film for decoupling said first means from said film to remanently store said binary value therein.

9. The circuit of claim 8 wherein said magnetic film exhibits positive magnetostriction.

10. The circuit of claim 8 wherein said film exhibits negative magnetostriction.

11. An information handling circuit comprising:

an elongated planar anisotropic thin magnetic film having an easy axis of remanent flux orientation directed transverse with respect to the longitudinal axis thereof and exhibiting at least a mechanically induced anisotropy directed along the longitudinal axis of the film in response to the mechanical tension or compression applied along its longitudinal axis;

first means coupled to said film for applying succeeding waves of tension and compression from one extremity along its longitudinal axis to the opposite extremity having a repetition frequency (*fo*) and a magnitude sufficient to cause orientation of the magnetization of said film along the axis of mechanically induced anisotropy;

circuit means coupled to different portions of said film for entering a binary value and providing an output manifestation for said binary value comprising:

an input circuit for applying a longitudinal field to a first portion of said film coupled when said first portion exhibits said induced anisotropy in response to said first means to conjointly orient the magnetization of said first portion of said film in one or an opposite direction along the longitudinal axis thereof to designate a binary value; and second means coupled to the opposite extremity of said film applying similar succeeding waves of tension and compression along the longitudinal axis thereof having a repetition frequency (*fo*) for controlling a stop, forward, and reverse propagation of said binary values.

No references cited.